US00RE36393E

United States Patent [19]

Glaser-Inbari

[11] E Patent Number: Re. 36,393

[45] Reissued Date of Patent: Nov. 16, 1999

[54] TWO-DIMENSIONAL RANDOM ACCESS SCANNER FOR OPTICAL DISKS

[75] Inventor: Isaia Glaser-Inbari, Givatayim, Israel

[73] Assignee: M.M.R.I. Photonics Ltd., Jerusalem, Israel

[21] Appl. No.: 09/143,242

[22] Filed: Aug. 28, 1998

Related U.S. Patent Documents

Reissue of:

[64] Patent No.: 5,764,603
Issued: Jun. 9, 1998
Appl. No.: 08/845,288
Filed: Apr. 21, 1997

U.S. Applications:

[63] Continuation of application No. 08/428,636, Apr. 25, 1995, abandoned.

[30] Foreign Application Priority Data

Apr. 25, 1994 [IL] Israel ..... 109426

[51] Int. Cl.[6] ..... G11B 7/095

[52] U.S. Cl. ..... 369/44.23; 369/44.24; 369/112; 369/118

[58] Field of Search ..... 369/44.12, 44.23, 369/44.24, 44.37, 112, 117, 118

[56] References Cited

U.S. PATENT DOCUMENTS 4,550,249 10/1985 Damen et al. .
5,317,551 5/1994 Shiono ..... 369/44.23 X
5,465,238 11/1995 Russell .
5,483,511 1/1996 Jewell et al. ..... 369/44.23 X

OTHER PUBLICATIONS

Ph. Marchand et al., "Motionless–Head for Parallel Readout Optical Disk," SPIE/IST Symp. on Electronic Imaging Science and Technology, Feb. 1992, San Jose, California, published in Proc. SPIE, vol. 1662 (SPIE, Bellingham, WA, 1992).

V. A. Ivanov et al., "Optoelectronic Neuroprocessor Based on Holographic Disk Memory," Optical Memory and Neural Networks, vol. 1, pp. 52–62 (1992).

Wai–Hon Lee, "Holographic Optical Head for Compact Disk Applications," Optical Engineering, vol. 28, No. 6, Jun., 1989, pp. 650–653.

*Primary Examiner*—W. R. Young
*Attorney, Agent, or Firm*—Browdy and Neimark

[57] ABSTRACT

A system and a method for optical access of the surface of an optical disk (or another moving media information storage device) with a very short seek time is presented. The system uses two-dimensional deflection of a light (typically laser) beam. The beam reaches a stationary lenslet array, where, at a particular moment, it intercepts a single lenslet. The lenslet focuses the beam to a spot on the information storage surface of the disk. For reading information, the beam is reflected through the lenslet. Taking advantage of the "cat-eye" retro-reflection principle, only one detector (or very few detectors) is needed. Since only one spot at the surface is illuminated at any given moment, this spot gets most of the laser's light, allowing sufficient power concentration when needed for writing information on the disk.

27 Claims, 5 Drawing Sheets

FIG. 7
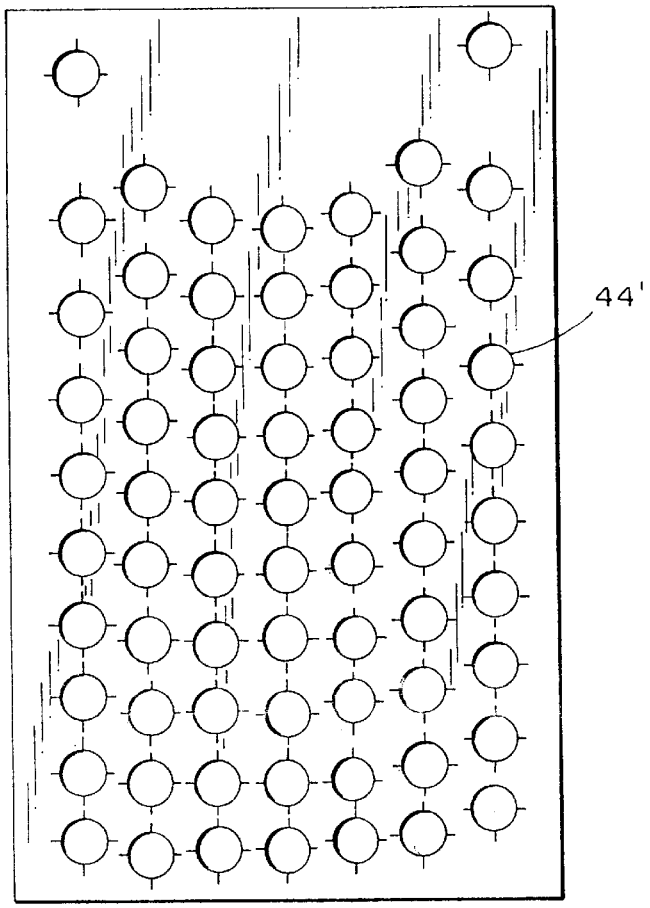
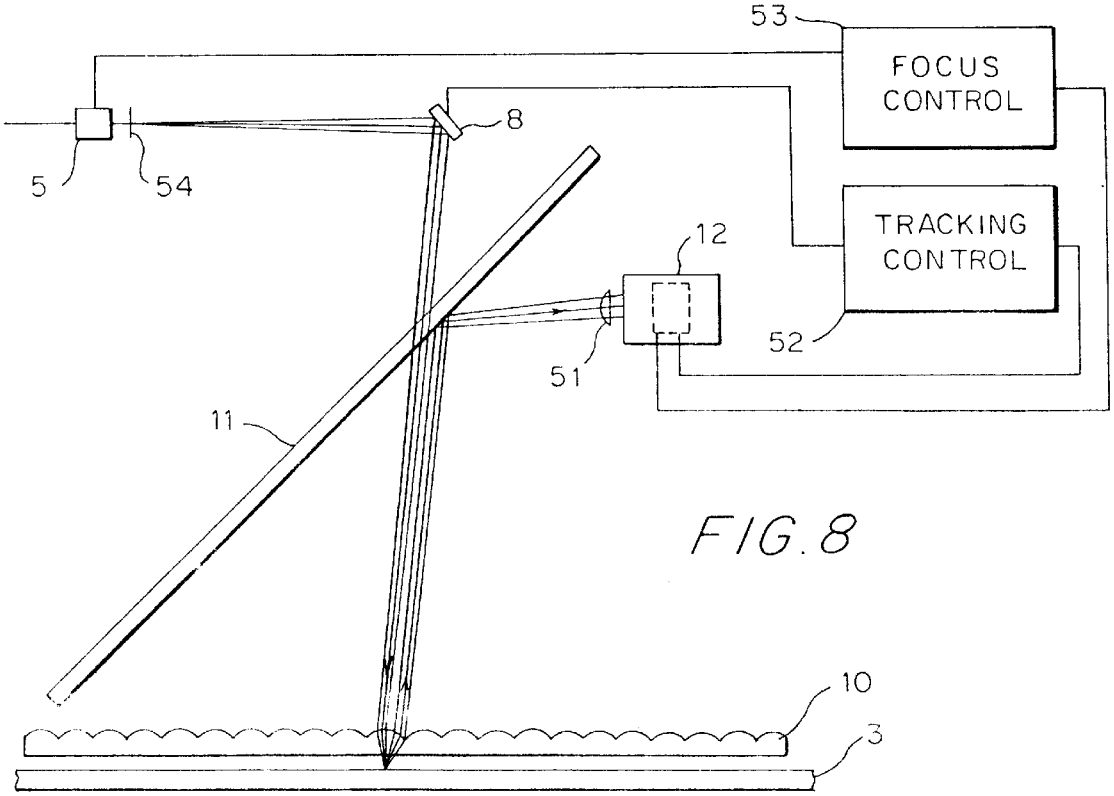
FIG. 8

TWO-DIMENSIONAL RANDOM ACCESS SCANNER FOR OPTICAL DISKS

Matter enclosed in heavy brackets [ ] appears in the original patent but forms no part of this reissue specification; matter printed in italics indicates the additions made by reissue.

This *application is a Reissue of application Ser. No. 08/845,288, filed Apr. 21, 1997, U.S. Pat. No. 5,764,603, which* application is a continuation of application Ser. No. 08/428,636, filed Apr. 25, 1995 now abandoned.

FIELD AND BACKGROUND OF THE INVENTION

The present invention relates to an optical scanning method and apparatus for directing and moving a spot or pattern of light, typically from a laser, across a line or an area on some given surface, for example, to access an area on a surface that moves linearly or angularly. The invention is particularly applicable to provide a rapid random-access optical scanner and method for optical disk data storage, and is therefore described below with respect to this application.

Optical disk data storage involves a number of somewhat conflicting requirements, including:

1. Fast Random-Access: In such data storage, the scanned line is not accessed in an orderly way, e.g., sequentially or predefined non-sequentially, but rather in a random manner known only during the actual operation of the system; random-access requires that the time to reach a requested point must be as short as possible (preferably around a millisecond or less).

2. High Resolution: That is, the size of the light spot formed by the scanning system (or, for some applications, the finest details in the pattern projected by the system) must be as small as possible, typically of the order-of-magnitude of the wavelength of the light; the precision of the scanning (the precision in the location of the spot) must be comparable with the spot size.

3. Large Space-Bandwith-Product: That is, the total number of points accessible by the scanning system should be large; this number roughly equals the length of the scan line divided by the spot size (a typical value should be at least in the thousands).

In addition, for some key applications, such as R/W (read/erase/write) and WORM (write-once read-many) optical computer disk systems, it is necessary to have:

4. High Light Power Concentration: That is, it must be possible to have enough energy delivered to a spot in a short time to affect a "write" operation.

For such R/W and WORM applications, it is desirable to focus most of the available laser beam power into a single spot for the "write" operation. Techniques for accomplishing this by illuminating many spots simultaneously (parallel access). or by optically encoding the data over an area on the disc (such as holographic storage). are described in a number of prior publications, including: Ph. Marachand. A. V. Krishnamoorthy, K. S. Urquhardt, P. Ambs, S. Esener and S. H. Lee, "Motionless Head for Parallel Readout Optical Disk," SPIE/IST Symp. on Electronic Imaging Science and Technology, February 1992, San Jose. Calif., published in Proc. SPIE, vol. 1662 (SPIE, Bellingham Wash., 1992); V. A. Ivanov, B. S. Kiselyov, A. L. Mikaelian and D. E. Okonov, "Optoelectronic Neuroprocessor Based on Holographic Disk Memory," Optical Memory and Neural Networks, vol. 1, pp. 55–62 (1992).

The standard solution is to put the entire laser/optics assembly (or most of it) at the end of a movable arm, just as is done today with magnetic heads for magnetic computer disks, and earlier with mechanical stylus pick-ups in phonograph players. However, laser/optics assemblies are heavier than magnetic disk heads. Therefore they cannot be accelerated and moved as quickly since the inertia of an object to rotation is proportional to the square of the distance of its mass from the center of rotation. As a result, optical disk systems are usually slower than magnetic disk ones.

Because light beams can be focussed and steered at a distance, it would be preferable to use a movable mirror (or some other beam steering device) away from the scanned surface and to keep the laser and most of the optics stationary. However, the combination of requirements 2 and 3 above, and the physical laws of optical diffraction, would dictate a rather large and heavy mirror. Such a mirror cannot be accelerated quickly and would therefore be incompatible with the fast random-access requirement 1.

There is thus an urgent need for a high resolution optical scanning method and apparatus which provide fast random-access, comparable to or better than that of a non-optical magnetic disk scanning system.

BRIEF SUMMARY OF THE INVENTION

According to the present invention, there is provided a method of directing an optical beam from an optical beam source to a selected location on a given moving surface, comprising: interposing a static array of image focussing elements adjacent to the given surface on the side thereof facing the optical beam source; and steering the optical beam from the source to a selected one of the image focussing elements to focus the optical beam to a selected location on the given surface.

According to further features in the preferred embodiments of the invention described below, the static array of image focussing elements is a two-dimensional array, and the optical beam is steered along two axes to a selected image focussing element.

The invention also provides apparatus operating in accordance with the above method.

As win be more particularly described below, the novel method and apparatus enable the combined moment-of-inertia of all movable parts to be kept as low as possible, thereby increasing speed and decreasing access time. In addition, it permits the focussing elements to be kept very close to the given surface (e.g., a rotatable optical disk record medium) so that the physical diameter of the optical beam can be kept small, thereby enabling the beam to be focussed to a spot in the order of the light wavelength.

The novel method thus enables the use of small, multi-dimensional beam steering devices together with a static array of image focussing elements to provide rapid random-access scanning of the record medium. Two-dimensional so steering of the beam may be effected by a single beam steering element (e.g., a mirror) driven along the two axes; preferably, however, it is effected by two beam steering elements (e.g., two mirrors) each driven along one axis. When two beam steering elements are used each offering a moderate space-bandwith-product, the total number of separable spot positions is proportional to the product of the space-bandwith products of the individual steering elements. Thus, using two movable mirror beam steerers with even a poor (and therefore not recommended) space-bandwith product of about 100 each enables attaining a system addressability of a few thousand locations.

The use of the static array of image focussing elements reorders the scanning pattern that is generated by the beam steering elements into another pattern and focusses the beam from a short distance into the necessary spot size. Spot sizes in the order of magnitude of the wavelength of the light are thus achievable. Even though the focused spots may not be arranged in a line, advantage is taken of the movement of the medium (e.g., rotation of an optical disk) to reach any desired location.

Practically all current writable optical disk media use heating by focussed laser beams for writing. In magneto-optical disks, writing is performed by applying an external magnetic field and heating one spot above the Curie point to obtain a change in the magnetization state. Such a technique is preferably used in the method and apparatus described below, but it is to be understood that the invention could also be implemented with other optical writing techniques, such as the use of phase-change materials.

Further features and advantages of the invention will be apparent from the description below.

BRIEF DESCRIPTION OF THE DRAWINGS

The invention is herein described, by way of example only, with reference to the accompanying drawings, wherein:

FIG. 7 illustrates another construction of blocking layer that may be used with another lenslet array;

FIG. 8 illustrates another modification in the system of FIG. 1 to enable detection of tracking and focus errors;

Figure 1:
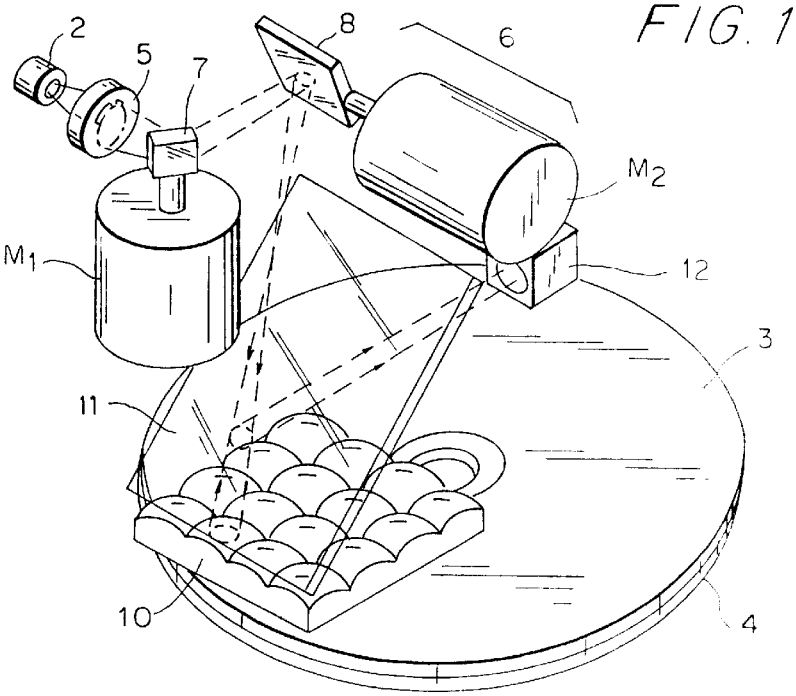
FIG. 1 schematically illustrates one form of optical scanning system in accordance with the present invention using a lenslet array for the image focussing elements.

It is to be understood that the above figures are not to scale. Although in most cases the optical system is depicted as if it is located on top of the record medium, the optical system could be located below the record medium. The number of focussing elements in the array of an actual system will in most cases differ from the illustrations in the drawings.

DESCRIPTION OF PREFERRED EMBODIMENTS

FIG. 1 illustrates one form of optical scanning apparatus constructed in accordance with the invention, wherein a laser beam from laser 2 is controlled to scan any selected location on a record medium, such as an optical disk 3 on a rotating holder 4. The laser beam exiting from the laser 2 first passes through beam shaping optics, schematically indicated at 5, to a beam steering system, generally designated 6, which steers the beam along two axes to any selected location. Thus, the beam steering system includes a mirror 7 reciprocated by a drive $M_1$ along one axis, and a second mirror 8 reciprocated by a drive $M_2$ along the other axis.

A static array of image focussing elements, generally designated 10, is provided adjacent to the optical disc 3 on the side thereof facing the optical beam source 2 and the beam steering system 6. The static array 10 is a two-dimensional array of refractive lenslets effective to focus the image of a beam entering each lenslet to a small spot on the optical disc 3.

The illustrated system further includes a beam splitter 11 aligned with beam steerer mirror 8. Beam splitter 11 is a static device and is effective to pass the beam from mirror 8 to the static array 10. Some of the light is reflected back from focussed spots on the optical disc via array 10 to the beam splitter 11, which is effective to relect the latter light to a static detector assembly 12.

Figure 2:
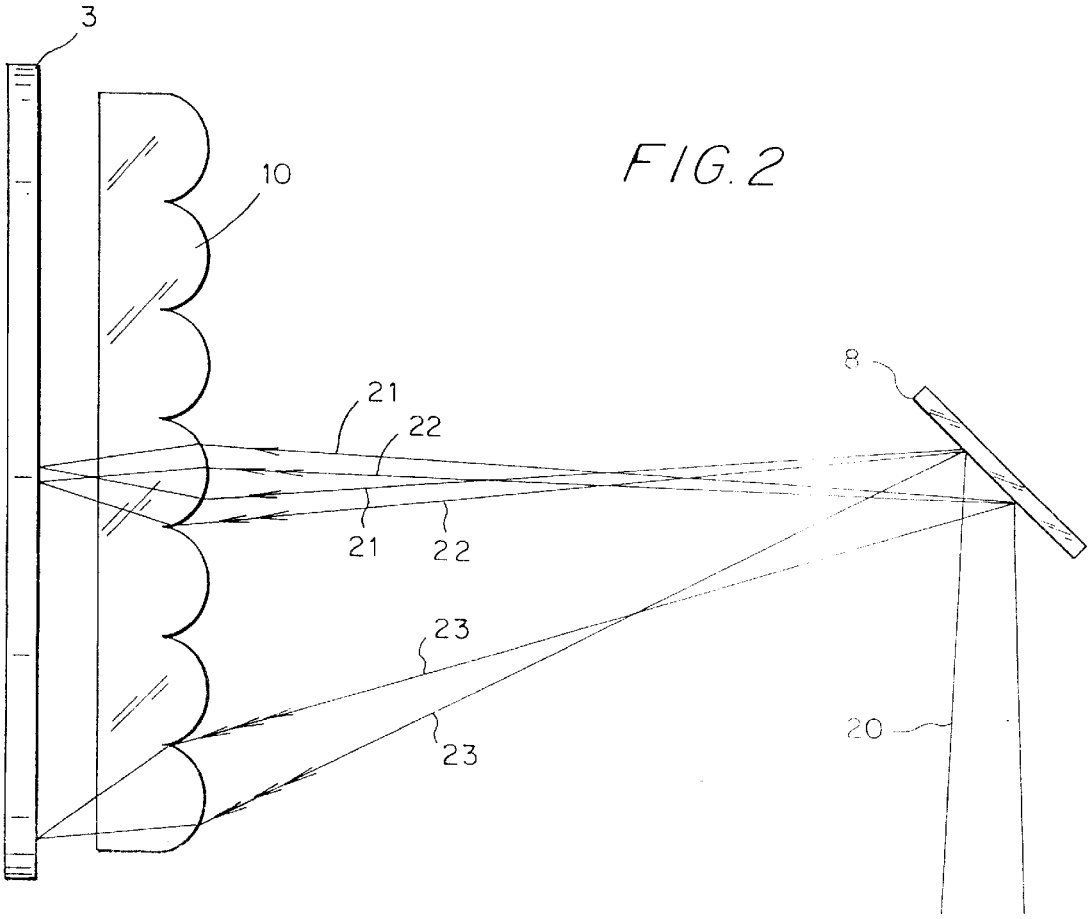
FIG. 2 is an enlarged sectional view of a portion of the system of FIG. 1.

FIG. 2 is a sectional view through one row of lenslets in the array 10 and illustrates the paths of the various beams from the steering mirror 8 of the beam steering system 6. This figure schematically shows the paths of the laser beam 20 as reflected by mirror 8 in three different positions of the mirror. Thus, in one position of the mirror, the beam (as, defined by the two single-arrow lines 21) will be focussed to a point $P_1$ on the optical disk 3; in a second position of the mirror, the beam (as defined by the two double-arrow lines 22) will be focussed to a point $P_2$ on the optical disk 3; and in a third position, the beam (as defined by the two triple-arrow lines 23) will be focussed to a third point $P_3$ on the optical disk 3. It is to be noted that more than a single point can be accessed through the same lenslet.

Figure 3:
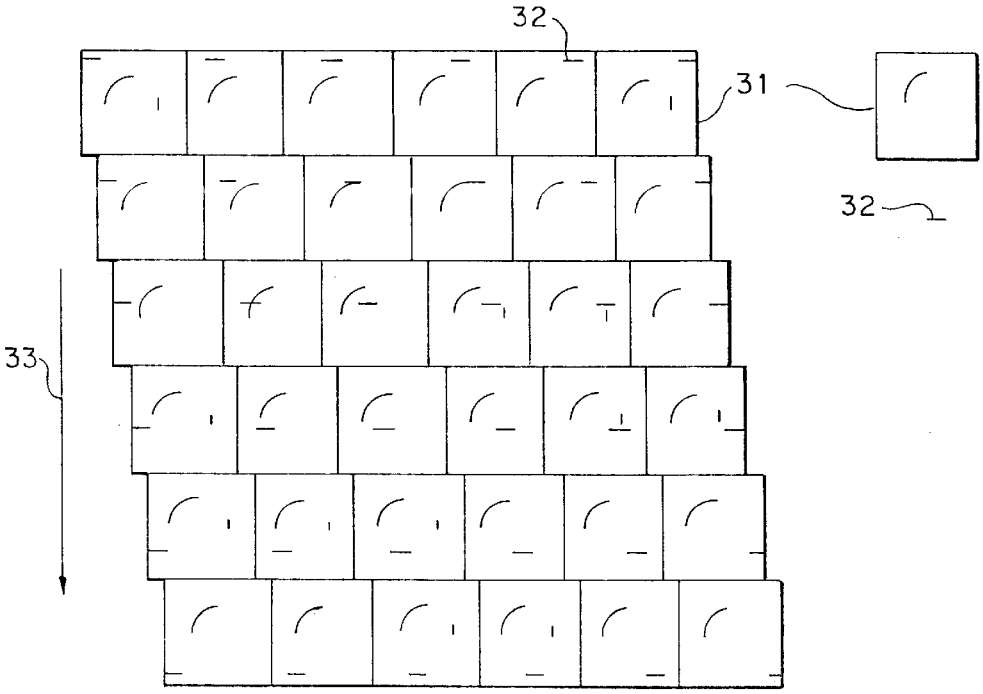
FIG. 3 is a top plan view of one of many possible lenslet arrays that may be used in the system of FIG. 1.

FIG. 3 is a top view illustrating one form of lenslet array 10 that may be used. Reference numeral 31 at the right side of FIG. 2 illustrates an individual lenslet, and reference numeral 32 depicts the locus of all points that can be accessed through that lenslet. This scanned pattern is a collection of spots of light that may be focussed by the lenslet on the surface of the optical disk 3. Arrow 33 of the left side of FIG. 3 indicates the direction of movement of the optical disk with respect to the lenslet array 10. FIG. 3 illustrates the scanned patterns for each of the lenslets. FIG. 7, described below, illustrates another lenslet arrangement that may be used.

It is to be noted that the lenslets in the array illustrated in FIG. 3 are not arranged in regular vertical columns, but rather are somewhat staggered. A conventional, non-staggered lenslet array can be used if it is slightly rotated so that the rows of the lenslets are not perpendicular to the direction of movement of the disk surface.

The skewing of the lines of the lenslets in the array, as shown in FIG. 3 (also in FIG. 7 to be described below), or a slight rotation of the cartesian lenslet array, is an important feature of the illustrated system. This allows filling in points that cannot be accessed by a single row of lenslets and thus enables access to all desirable points on the moving record medium.

Figure 4:
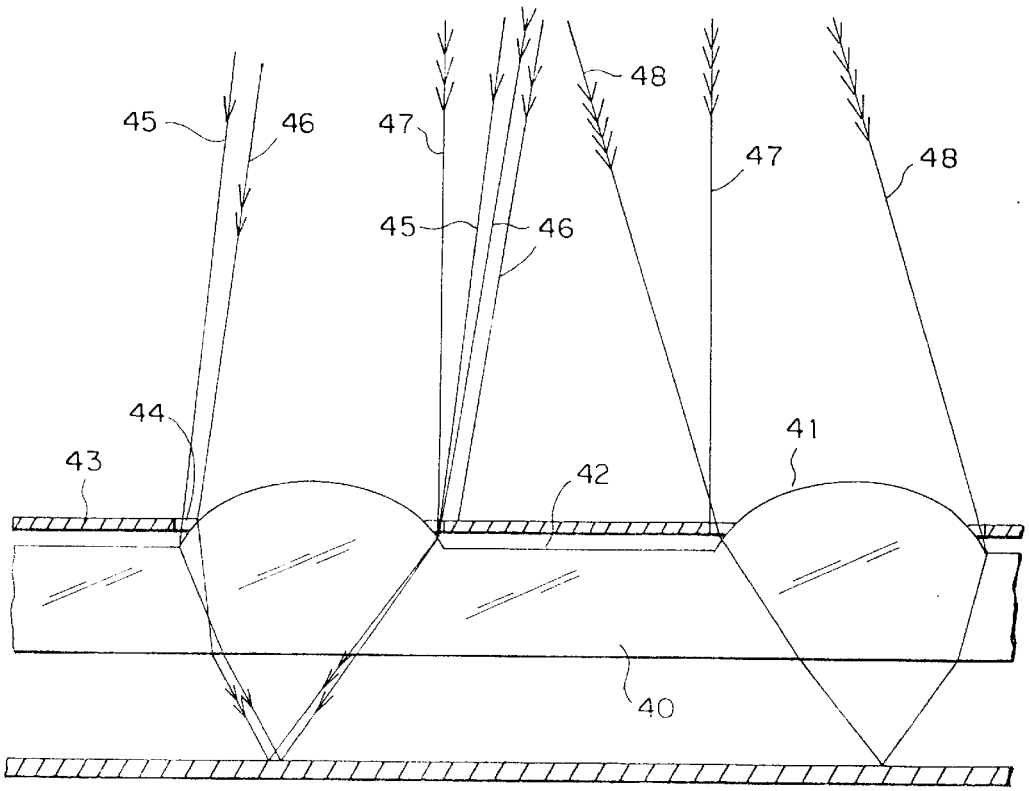
FIG. 4 is an enlarged, fragmentary, cross-sectional view of a modified lenslet array.

FIG. 4 illustrates a modified construction in the lenslet array. In this modified lenslet array, therein designated 40, the individual lenslets 41 are not adjacent to each other, but rather are spaced apart by sections 42. A light blocking layer or mask 43 is applied over the upper surface of the lenslet array 40 and is formed with openings 44 aligned with the individual lenslets 41. Thus, mask 43 permits the optical beam to pass only to the individual lenslets 41, and prevents light from reaching the sections 42 between the individual lenslets.

FIG. 4 illustrates four light beams 45, 46, 47, 48, corresponding to four positions of the beam steering system 6 (FIG. 1). Beams 45 and 46 are focussed by the left lenslet 41 into two distinct spots on the surface of the optical disk 3; beam 47 is blocked by the mask 43; and beam 48 is focussed by the right lenslet 41 onto the surface of the optical disk 3.

Figure 5:
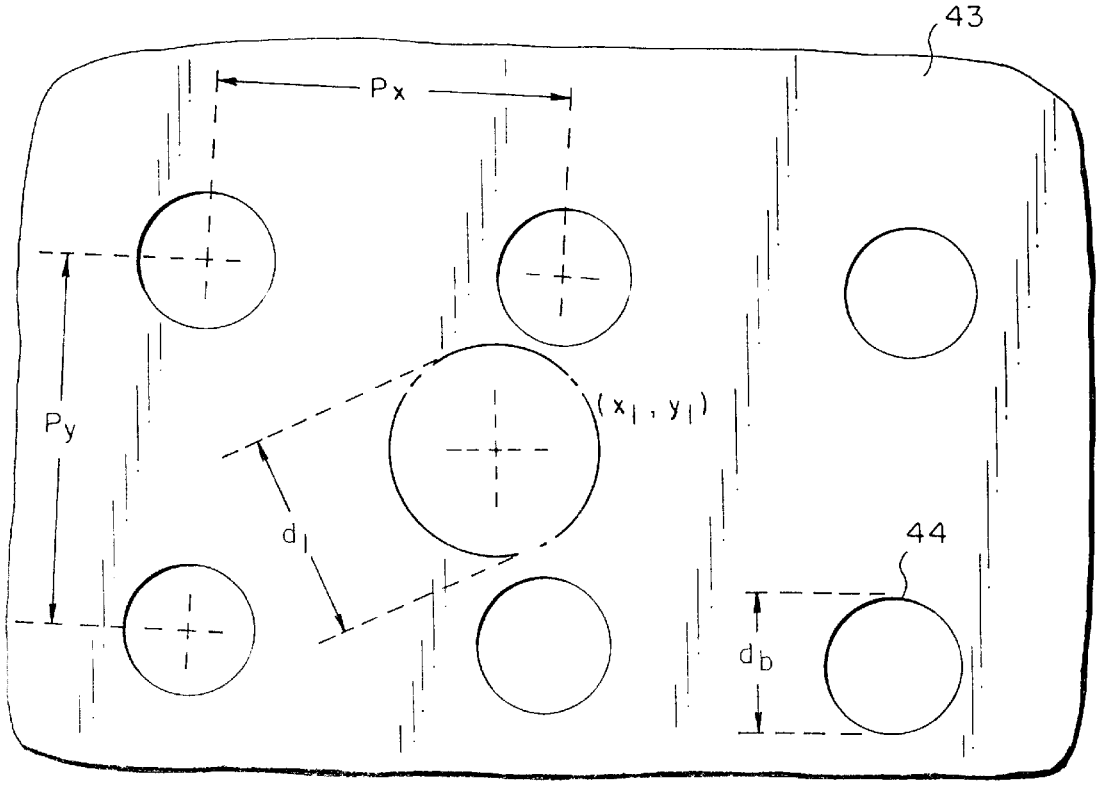
FIG. 5 illustrates a blocking layer that may be used in the lenslet array.

FIG. 5 illustrates the construction of the blocking mask 43, wherein each of the openings 44 has a diameter $d_b$. Their centers are spaced along the X-axis and Y-axis by the distances $P_x$ and $P_y$, respectively. The optical beam diameter in this plane is $d_1$, and the beam location is defined as $x_1$, $y_1$.

When the blocking layer 43 is very close to the lenslet array 40, the laser light cannot reach two lenslets at the same time if:

$$d_1<P_x-d_b \qquad (1)$$

$$d_1<P_y-d_b$$

To obtain a spot size ($d_S$) of about 1.2λ (wherein "λ" is the wavelength of the light), it is necessary to have a converging beam with a cone angle of roughly 60° so that the focal length for each of the lenslets must be $F=d_b$. It can be shown that the number of tracks $K_1$ that can be spanned through a single lenslet 41 is as follows:

$$K_1 = \frac{2(d_1 - d_b)F}{Z_c}\frac{1}{\Delta r} = \frac{d_b(d_1 - d_b)}{\lambda Z_c} \qquad (2)$$

wherein $Z_c$ is the distance between the closest steering mirror (8 in FIGS. 1 and 2) and the surface of the optical disk 3.

For example, let us assume $\lambda=0.9\times10^{-3}$ mm, lenslet array pitch $p_x=p_y=1$ mm, and blocking layer apertures of a diameter $d_b=0.3$ mm. To satisfy eq. (1) we select $d_1=0.7$ mm. For $Z_c=13$ mm we get $K_1=10$.

As evident from this example, it is sometimes desirable to have a $Z_c$ that is smaller than can be easily realizable physically.

Figure 6:
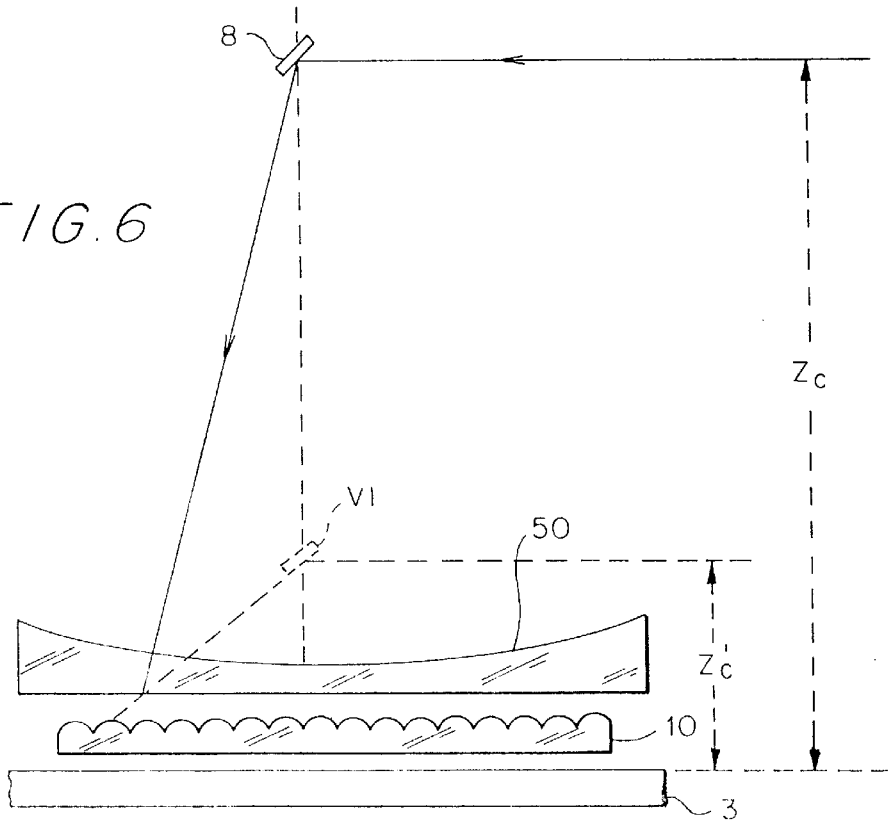
FIG. 6 illustrates a modification in the system of FIG. 1 to change the effective location of the beam steering mirrors.

FIG. 6 illustrates the use of a large negative lens 50 to make the lenslet array see the virtual image VI of the beam steering mirror (8), at height $Z'_c$, which is smaller than $Z_c$. With the configuration of FIG. 6. $Z'_c$ is calculated using the standing imaging formula for the negative lens, and $1Z'_c1$ is then used instead of $Z_c$ in eq. (2).

Instead of using a large negative lens 50, this lens may also be a positive lens to provide $Z'_c<0$ such that $|Z_c'|<Z_c$. This lens may also be a cylindrical lens or a torus-shaped lens.

The blocking layer 43 may have non-circular openings 44, such as rectangular. Also, the optical beam may also have a shape other than circular at the plane of the lenslet array.

Further, it may be desirable to arrange the lenslets according to a non-cartesian array. In such case, the blocking mask would be similarly formed with a non-cartesian array of openings, as shown at 44' in FIG. 7.

For reading (or writing) data from optical disks, it is necessary to be able to locate and track the requested data precisely and in focus. Since it is not practical to manufacture and/or position optical disks within the tolerances (centering and surface flatness) necessary to achieve this precision in an open loop system. FIG. 8 illustrates a feedback-based tracking and focussing system which may be used.

Schemes using three beams for tracking error detection and astigmatic focussing error detection are already in use with conventional (head at the end of arm) optical disk drives. FIG. 8 illustrates how these well known methods can be implemented in the above-described system. An example of a paper describing the prior art with respect to tracking/focus error detection in conventional optical disk drives is: W-H Lee. "Holographic Optical Head for Compact Disk Applications," Optical Engineering. vol. 28. pp. 650–653 (1989).

The system in FIG. 8 includes a phase grating 54 next to the beam shaper 5. Phase grating 54 splits the single beam into three different diffraction orders (−1,0, and +1). A low power cylindrical lens 51 is added in front of the static detector assembly (12, FIG. 1). Lens 51 generates and introduces a small amount of astigmatism into the image of the laser spot detected by the detector assembly.

Grating 54 thus splits the laser beam into three orders. The stronger zero order is used to read and write data, whereas the two ±1 orders are used to detect tracking errors. They create two extra spots on the disk surface which are normally slightly off track. When there is a tracking error, one of these side spots reflects more light than the other, so that the direction of the error can be detected by the detector assembly 12 and used for controlling the tracking system in a feedback loop including tracking control unit 52.

An alternative arrangement to grating 50 would be to provide a large grating (not shown) placed on top of the lenslet array 10.

Cylindrical lens 51 is used to provide a focus error signal. By introducing some astigmatism into the image of the spot, the image becomes elliptical when the system is off focus. The direction of the major axis of this elliptical spot image indicates the sign of the error. This focussing error may thus also be used to correct focus in a feedback loop from detector assembly 12 to a focus control unit 53.

An alternative arrangement would be to introduce some intentional astigmatism through the individual lenslets in the array, or in the large lens (50, FIG. 6).

Figure 9:
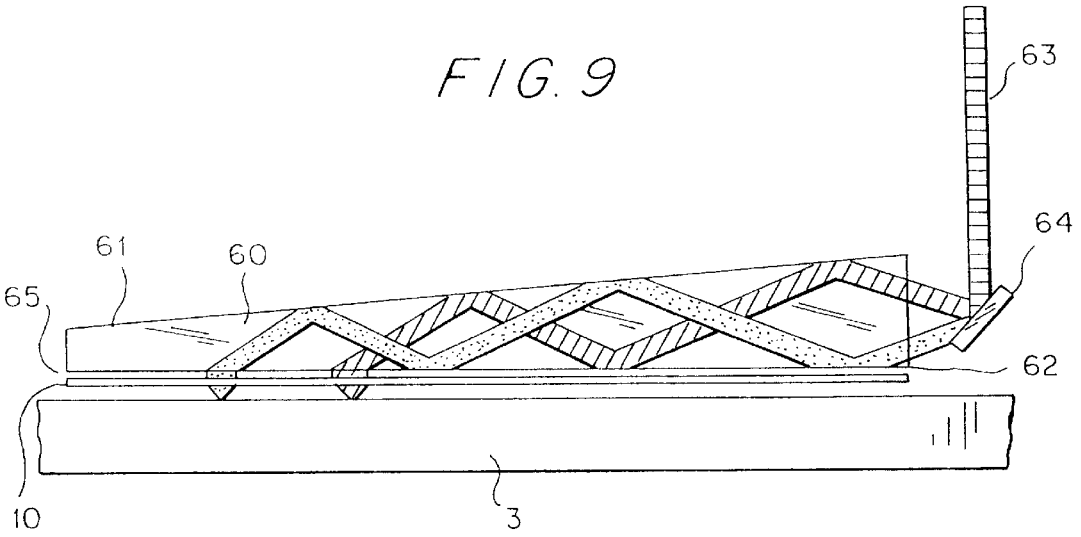
FIG. 9 illustrates one form of planar optical member which may be used in order to provide a more compact system.
Figure 10:
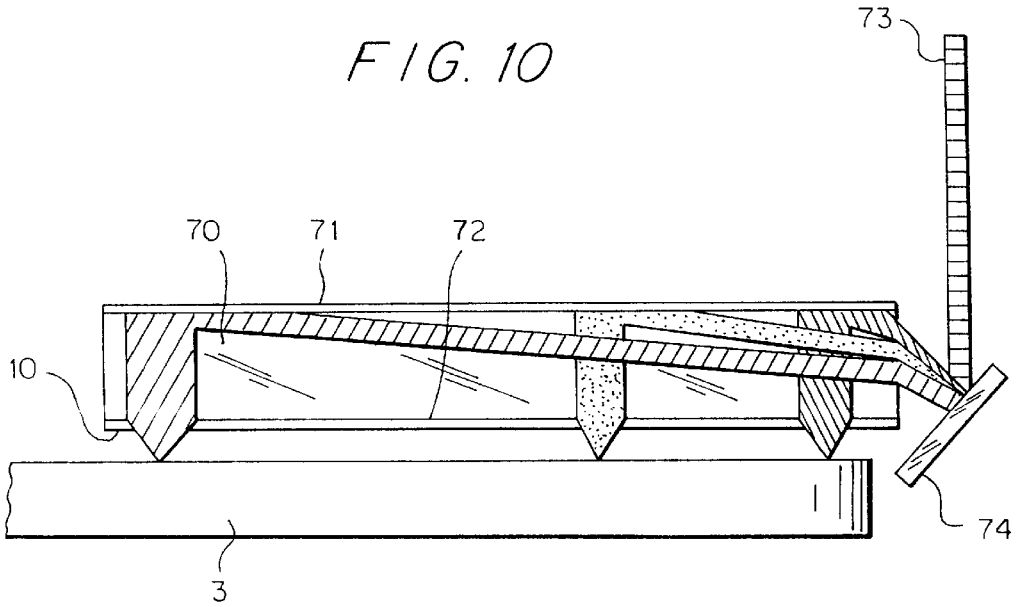
FIG. 10 illustrates another form of planar optical member that may be used to provide a more compact system.

The system may also be made more compact by using planar optical members which allow trapping and manipulating light in a small volume. FIGS. 9 and 10 illustrate two examples of planar optical members that may be used for this purpose.

In FIG. 9 the planar optical member is in the form of a transparent slab 60 having one surface 61 which is slanted with respect to its opposed surface 62. Slab 60 is placed with its surface 62 over, in close proximity to or in contact with, the static array 10 of the lenslets overlying the optical disk 3.

The optical beam 63 from the beam steering system (6, 45 FIG. 1) is reflected by a removable reflector 64 (which replaces mirrors 7 and 5 of FIG. 1) into the edge of the planar optical member 60. The converging surfaces 61, 62 of member 60 produce multiple reflections of the optical beam at decreasing angles to the normal of its surface 62 facing the lenslet array 10. Surface 62 may be spaced from the upper surface of the lenslet array 10 by space, shown at 65, in the form of a simple air gap, or by an interferometric multi-layer coating applied for example by vacuum deposition or by optical holographic recording.

The laser beam 63, after it has already passed through beam shaping optics, is deflected by the beam steering mirror 64 (or two mirrors, only one of which is shown) to enter the slab 60 from the side. The upper surface 61 of the slab reflects back all beams, either by total internal reflection or by the help of a reflective layer. Since this surface is sloped, the angle of the reflected beam relative to the plane of the bottom surface 62 changes after each reflection; i.e., its angle with respect to the normal to surface 62 decreases. As a beam reaches the bottom surface of the slab 60, it will be either reflected by surface 62 back towards surface 61, or transmitted through surface 62. This is controlled by layer 65 which, as indicated earlier, may be a simple air gap or an interferometric multi-layer coating. In either case, beams at relatively large angles to the normal to surface 10 are reflected back into the slab, whereas beams of small angles to the normal to surface 62 pass through. As a beam is reflected back and forth between the two surfaces 61, 62, the angle of its incidence changes gradually until, at one place, it can pass through surface 62.

The location where a beam passes through surface 62 and layer 65 is dictated by the original direction of the beam, as dictated by the beam steering mirror 64. Once a beam gets through, it is focussed by the respective image focussing element in the static array 10.

FIG. 10 illustrates an arrangement including a planar optical member 70 in the form of a transparent slab having a rectangular cross section with parallel top and bottom surfaces. In this case, the top layer 71 is holographic and reflects light to the bottom layer 72 which contains, or overlies, the static array 10 of the image focussing elements. Thus, the laser beam 73 is directed to the beam steering side mirror 74 which reflects the beam into the edge of the planar optical member 70. The beam exits at a preselected location, as determined by the beam steering mirror 74, to be focussed by the respective focussing element of the static array 10 onto the optical disk 3.

It will thus be seen that the two arrangements illustrated in FIGS. 9 and 10 act similarly to the previously described arrangements except that the planar optical member (60 in FIG. 9 and 70 in FIG. 10) act to compress the space that exists between the beam steering elements and the static array of image focussing elements.

Other schemes to compress space are also possible, including the use of one or more mirrors to fold the optical path, or the use of planar optical elements of different shape and/or design than the ones depicted in FIGS. 9 and 10. Such planar optical elements may use a curved, or a multi-faceted surface or surfaces.

In all the previously described embodiments, the static array of image focussing elements is described as an array of refractive lenslets. It will be appreciated, however, that the image focussing elements in any one of the above-described embodiments could be an array of diffractive lenses, such as an array of holograms or a multi-facet mirror. The optical beam in the above-described embodiment is from a diode laser, but other optical beams could be used. Also, while the record medium is shown as being a rotatable disk, it will be appreciated that other record media could be used, such as a tape, or a drum. Further, while the above described embodiments relate to optical recording and reading of data, the invention can also be used for computer graphics and other applications.

Many other variations, modifications and applications of the invention will be apparent.

I claim:

1. A method of directing an optical beam from an optical beam source to a selected storage location spot on the surface of a moving optical storage medium, comprising:

interposing a static two-dimensional array of image focussing elements adjacent to the surface between the surface and the optical beam source; and steering the optical beam from the source to a selected single one of said image focussing elements in the two-dimensional array to focus the optical beam to a single selected storage location spot on the surface.

2. A method in accordance with claim 1, wherein the storage location spot to which the optical beam is focussed has a size in the order of magnitude of the light wavelength of the optical beam.

3. The method according to claim 1, wherein the optical storage medium is a rotatable optical data disk.

4. The method according to claim 1, wherein said static two-dimensional array of image focussing elements is an array of refractive lenslets.

5. The method according to claim 1, wherein said static two-dimensional array of image focussing elements is an array of diffractive lenses.

6. The method according to claim 1, further comprising interposing an apertured mask between the array of image focussing elements and the optical beam source to prevent the optical beam from reaching two image focussing elements at the same time.

7. The method according to claim 1, further including the step of reflecting the optical beam from the focussed spot via an image focussing element to a static detector assembly.

8. The method according to claim 7, wherein the reflected optical beam is reflected via a beam splitter to the static detector assembly.

9. The method according to claim 7, further including introducing some astigmatism into the optical beam reflected from the selected image focussing element and using said introduced astigmatism for detecting and correcting focussing errors.

10. The method according to claim 1, further including providing a lens adjacent the image focussing elements between the image focussing elements and the optical beam source to produce a virtual image of the optical beam close to the image focussing elements.

11. The method according to claim 1, further including disposing a planar optical member over the array of image focussing elements, wherein said steering step comprises steering the optical beam into an edge of the planar optical member.

12. The method according to claim 1, further including passing said optical beam through a grating before the optical beam reaches said static array of image focussing elements to split the beam into a zero order straddled by two weaker-orders, and using said two weaker orders for detecting and correcting tracking errors.

13. Apparatus for directing an optical beam from an optical beam source to a selected storage location spot on the surface of a moving optical storage medium, comprising:

a static two-dimensional array of image focussing elements located adjacent to the surface between the surface and the optical beam source; and means for steering the optical beam from the source to a selected single one of said image focussing elements in said two-dimensional array to focus the optical beam to a single selected storage location spot on the surface.

14. An apparatus in accordance with claim 13, wherein the storage location spot to which the optical beam is focussed has a size in the order of magnitude of the light wavelength of the optical beam.

15. The apparatus according to claim 13, wherein the optical storage medium is a rotatable optical disk, and further including a holder for the rotatable optical disk.

16. The apparatus according to claim 13, wherein said static two-dimensional array of image focussing elements is an array of refractive lenslets.

17. The apparatus according to claim 13, wherein said static two-dimensional array of image focussing elements is an array of diffractive lenses in the form of a hologram.

18. The apparatus according to claim 13, further including an apertured mask interposed between said two-dimensional array of image focussing elements and the optical beam source, which mask prevents the optical beam from reaching two image focussing elements at the same time.

19. The apparatus according to claim 13, further including means for detecting the optical beam after reflection from a focussed spot via one of said image focussing element.

20. The apparatus according to claim 19, further including a beam splitter located to pass the optical beam from the optical beam source to the array of image focussing elements, and to reflect the optical beam reflected from the selected image focussing element to said means for detecting.

21. The apparatus according to claim 20, further including a lens between said beam splitter and said means for detecting, said lens designed to introduce some astigmatism into the beam, and a control system for detecting and correcting focussing of the beam in response to the output of said lens.

22. The apparatus according to claim 13, further including a negative lens adjacent to the image focussing elements between said elements and the optical beam source, said negative lens being designed to produce a virtual image of the optical beam close to the image focussing elements.

23. The apparatus according to claim 13, further including a planar optical member overlying the array of image focussing elements, said means for steering steering the optical beam into an edge of said planar optical member.

24. The apparatus according to claim 23, wherein said planar optical member is a slab having one surface which is slanted with respect to an opposed surface to thereby produce multiple-reflections of the optical beam steered into the edge of said planar optical member at decreasing angles to the normal of said opposed surface until the optical beam exits from said member at a selected location thereof to a selected one of said image focussing elements.

25. The apparatus according to claim 23, wherein said planar optical member includes a holographic layer on the side thereof opposite to that facing said image focussing elements, to reflect the light to a selected one of said image focussing elements.

26. The apparatus according to claim 13, further including a grating located upstream of said static array of image focussing elements to split the beam into a zero order straddled by two weaker±orders, and a control system for detecting and correcting tracking errors in response to said two weaker orders.

27. In a method for reading from and writing to selected storage location spots on an optical storage medium using a focussed optical beam the improvement wherein the optical beam is directed from an optical beam source to a selected storage location spot on the optical storage medium by steps comprising:

interposing a static two-dimensional array of image focussing elements adjacent to the optical storage medium, between the optical storage medium and the optical beam source; and steering the optical beam from the optical beam source to a selected single one of said image focussing elements in the two-dimensional array to focus the optical beam to a single selected storage location spot on the optical storage medium.

* * * * *